United States Patent [19]

Tomic

[11] 4,394,174

[45] Jul. 19, 1983

[54] PHOSPHATE CEMENT AND MORTAR

[75] Inventor: Ernst A. Tomic, Wilmington, Del.

[73] Assignee: E. I. Du Pont de Nemours & Co., Wilmington, Del.

[21] Appl. No.: 383,453

[22] Filed: Jun. 1, 1982

[51] Int. Cl.³ ............................................. C04B 9/04
[52] U.S. Cl. ..................... 106/85; 106/121; 501/111; 501/118; 501/119
[58] Field of Search ............ 501/111, 118, 119; 106/85, 121

[56] References Cited

U.S. PATENT DOCUMENTS

| | | | |
|---|---|---|---|
| 2,450,952 | 10/1948 | Greger | 106/85 |
| 3,525,632 | 8/1970 | Enoch | 106/121 |
| 3,658,563 | 4/1972 | Washio et al. | 501/111 |
| 3,923,534 | 12/1975 | Cassidy | 501/111 |

*Primary Examiner*—James Poer

[57] ABSTRACT

A storable cement product is a dry mixture of magnesium oxide (MgO) and aluminum phosphate, or a product containing MgO and, separated therefrom, an aqueous aluminum phosphate solution, some or all of an inert aggregate component optionally being present in either product. In 45-kg samples, the mortar formed when the MgO, phosphate, water, and aggregate are combined attains an exotherm in the range of about 40°–90° C. after an interval of 10 minutes. The mortar hardens quickly thereafter, and is uniquely suited for patching roads under varying conditions of application and use. The reaction exotherm is controlled by a unique combination of the concentrations of the four critical components, and the surface area and particle size of the MgO.

18 Claims, No Drawings

PHOSPHATE CEMENT AND MORTAR

BACKGROUND OF THE INVENTION

1. Field of the Invention

The present invention relates to a cement product containing magnesium oxide and a phosphate, and to a mortar formed from the cement product and adapted to be used for various commercial and industrial applications, especially to patch holes in weight-bearing surfaces such as highways, driveways, bridgedecks, and the like.

2. Description of the Prior Art

A cement is a particulate composition that sets up and hardens to a strong, dense monolithic solid upon being mixed with a liquid and allowed to stand. Cements find utility in many areas of commerce, especially in the construction industry, where they are often used in conjunction with various aggregate materials to form such articles as concrete slabs, etc. Cements are also used for highway construction, and in highway patching operations. For highway patching, quick-setting cements, i.e., those which develop an adequate set strength rapidly, are required so that road closing times can be kept to a minimum.

Organic cement compositions, containing polymers which cross-link or cure rapidly when mixed with an appropriate liquid component, are employed for various purposes, and polymer concretes based on furfuryl alcohol, polyester-styrene, and methyl methacrylate have been developed for roadway and runway repair. However, except in cases in which the end-use requirements are highly specialized, organic cements are at an economic disadvantage when compared to inorganic cements. The technology of quick-setting inorganic cements, has focussed largely on the phosphate system, in which a basic component, usually magnesium oxide, reacts with phosphoric acid or a salt thereof in the presence of water. One of the problems encountered with this system, however, is that the reaction is often so fast that the mortar does not remain workable long enough to enable a user to comfortably work it into place, e.g., by trowelling. Thus, while the cement must form a rapid-setting mortar, the rapid setting must not begin until a long enough lead time, at least about ten minutes in most circumstances, has elapsed.

Another important requirement of cements to be used for patching roadways is a compressive strength adequate to support vehicular traffic soon after the mortar has hardened in place, e.g., in about an hour. Until now, the prior art has not had available phosphate cements which can be effectively and systematically controlled with respect to the working time of mortars made therefrom, more particularly without causing unacceptable deleterious effects on the mortar's rate and degree of strength development after placement, an important consideration in road patching.

In the patching method described in U.S. Pat. No. 3,821,006, a patching mortar is prepared by adding water to 7-50 parts of a mixture of minus 100 mesh dead-burned magnesium oxide particles with an acid phosphate salt, and 93-50 parts of an inert aggregate. The acid phosphate salt is monoammonium, monosodium, or monomagnesium phosphate. The ammonium phosphate mortar has a short working time, i.e., less tha six minutes, which is said to be extendible by the addition of sodium chloride or by cooling the dry mix and water before mixing. However, the addition of sodium chloride carries the penalty of reduced compressive strength, which is more pronounced with larger additions. Cooling the dry mix and water is impractical. Increasing the particle size of the magnesia to minus 80 mesh lengthened the working time but decreased the compressive strength to a level deemed undesirable for highway patching. Cements containing monomagnesium and monosodium phosphates produced mortars having short working times and extremely low compressive strengths after curing.

The method of making a fast-setting concrete structure described in U.S. Pat. Nos. 3,879,209 and 4,059,455 also is based on the reaction between magnesium oxide and ammonium phosphate. However, in this instance, the ammonium phosphate to be mixed with magnesium oxide is in an aqueous solution containing polyphosphates. While the specific setting time and early strength depend on the polyphosphate content, these compositions are characterized by short working times, generally 4-5 minutes. Moreover, the highest early strengths are shown to be tied to the shortest working times, so that this system would appear to be unsuited to the achievement of longer working times, e.g., about 10 minutes, in combination with satisfactory early compressive strengths.

U.S. Pat. No. 4,152,167 also describes a composition containing magnesium oxide, ammonium phosphate, and a polyphosphate. In this case, however, the magnesium oxide and the phosphates are in a dry matrix-forming composition, which can be admixed with aggregate or filler material to provide a product which, when mixed with water, sets to form a solidified mass. The dry mix consists of 30-66% dead-burned magnesium oxide, 25-59% monoammonium phosphate, and 1-27% of a water-soluble polyphosphate. Although the composition is said to be readily workable prior to setting, and is described as not generating an undesirable exotherm and as setting to form a solidified mass of high compressive strength, the exemplified mixtures remained fluid for only 1 to 8 minutes, and the length of time required for the hardened mortar to achieve sufficient strength to support vehicular traffic when used in a road patch is not disclosed. The only composition which is shown to have a compressive strength of more than 13,800 kPa after curing for one hour was fluid for only one minute and hardened thoroughly in about 4 minutes.

The magnesium oxide-ammonium phosphate compositions described in U.S. Pat. No. 3,960,580 contain an oxyacid of boron, or a salt or ester of such an acid, as a retardant of the setting time. The one-component product, like the product described in U.S. Pat. No. 4,152,167, requires only the addition of water for activation. The two-component product, like that described in U.S. Pat. Nos. 3,879,209 and 4,059,455, contains an ammonium phosphate solution which includes polyphosphates. Although the boron additive is said to have extended the setting time of the compositions, there is no indication of whether the setting times shown represent working time, i.e., whether the compositions were fluid enough to be mixed and worked into place over the entire disclosed period of time. Moreover, the boron additive dramatically lowered the early strength of the compositions so that road closing times of several hours or days could be necessary if the compositions were employed to patch roadways.

Phosphate cements based on aluminum phosphate as the phosphate component heretofore have been described, for example, in such fields as pigment-containing adhesives and rock bolt grouts. For example, U.S. Pat. No. 2,450,952 describes a dry cement mixture of components reactible upon admixture with water to form an adhesive, the components consisting of a water-soluble aluminum phosphate and magnesia, olivine and/or magnesium silicate. The magnesium compound constitutes about 65–90% of the dry mixture, while the weight ratio of the magnesium compound to the aluminum phosphate is 2:1 to 8:1. The magnesium oxide is used in combination with olivine (a silicate), and the rapid set is said to be slowed down by transforming the magnesium oxide grain or its surface into magnesium silicate, or coating the grain with silicic acid.

The phosphate rock-bolt grouting system described in U.S. Pat. No. 4,174,227 includes products containing aluminum phosphate, magnesium oxide, aggregate, and water which harden around a rock bolt usually in about 1–2 minutes and reach a pull strength of at least about 175 kilograms per centimeter of bolt-anchoring length usually in 5–10 minutes. Very little working time, e.g., about 15–45 seconds, is required, and the fastest strength development possible is needed to prevent mine roof failure. These compositions are not adapted to be road-patching compositions because of their extremely short working time. Moreover, their rapidly developed high pull strength is not required of road-patching compositions. The ability of aluminum phosphate to form a crosslinked polymeric network in the hardening reaction has been suggested as being related to the rapid development of high pull strength in rock bolt grouts containing aluminum phosphate, thereby causing this system to be associated more particularly with applications requiring fast strength development.

The magnesium oxide used in the rock bolt grouts of U.S. Pat. No. 4,174,227 has a surface area of preferably at least one, and in the range of up to about 40, square meters per gram, i.e., it is the so-called "chemical grade" magnesium oxide. It constitutes about from 5 to 35, and preferably about from 8 to 25, percent of the total weight of the grout. The aggregate constitutes about from 30 to 70 percent of the total weight of the grout, and the aggregate particles have a minimum dimension no larger than about 3 millimeters. The grouting compositions of U.S. Pat. No. 4,174,227 can contain magnesium oxide of low surface area only if the magnesium oxide particle size is small, i.e., more than about 95 percent of the particles pass through a 200-mesh screen, and its concentration is high, i.e., 18 to 25 percent.

SUMMARY OF THE INVENTION

The present invention provides an improved storable cement product particularly suited for such applications as the patching of roadways and containing (a) magnesium oxide in the form of particles which have a surface area of less than about 1 square meter per gram, preferably a fused or dead-burned grade of magnesium oxide, up to 90, and often only up to about 50, percent of which particles pass through a 200-mesh screen, and 10 percent of which particles are held on a 170-mesh or coarser, in many cases a 35-mesh or coarser, screen; and (b) aluminum phosphate, i.e., $Al(H_2PO_4)_3$, also expressed as $AlH_3(PO_4)_2 \cdot H_3PO_4$; components (a) and (b) being adapted to be combined with water and an inert aggregate of mixed particle sizes e.g., sand and gravel, in amounts such as to form a mixture therewith comprising, by weight, about from 3 to 25, and in many instances no more than about 10, percent of component (a), about from 10 to 15 percent of component (b), about from 5 to 10 percent water, and about from 50 to 82, and in many instances at least about 60, percent aggregate, and thereupon to undergo a reaction which raises the temperature of a 45-kilogram sample of the mixture to a peak temperature in the range of about 40° to 90° C., preferably about from 50° to 70° C., at a rate such that the peak temperature is reached after the elapse of at least 10 minutes after the formation of the mixture.

The reaction of components (a) and (b) causes the mixture to be transformed into a product which, after the attainment of the peak temperature, and usually within about an hour from the time that the mixture has been formed, is hard and of the nature of concrete. Consequently, the hardenable mixture is referred to herein as a concrete precursor, or simply as a mortar, the term "mortar" being used herein to denote any mixture containing the four critical components magnesium oxide, aluminum phosphate, water, and aggregate, regardless of aggregate size.

The mesh numbers given herein to describe particle sizes refer to the number designations of the U.S. Standard Sieve Series.

The term "aluminum phosphate" as used herein to define component (b) of the cement product of the invention denotes aluminum dihydrogen phosphate, $Al(H_2PO_4)_3$, also expressed as $AlH_3(PO_4)_2 \cdot H_3PO_4$. Other aluminum phosphates such as aluminum monohydrogen phosphate, $Al_2(HPO_4)_3$, and polyphosphates such as $H_2AlP_3O_{10}$ are not useful because they are not sufficiently water-soluble to allow them to react. However, small amounts, e.g., about 5% or less, of such phosphates, which may be present in the $Al(H_2PO_4)_3$ as a result of having been formed during its preparation, can be present in the aluminum phosphate with no deleterious effects. Therefore, the term "aluminum phosphate" denotes aluminum dihydrogen phosphate, with or without such small amounts of water-insoluble aluminum phosphates.

In one embodiment of the invention, the cement product is a storable dry mixture of components (a) and (b), which are adapted to react together when the product is combined with the aggregate and water to form the above-described hardenable mixture. In this dry-mix product, the magnesium oxide content is about from 24 to 63, and in many instances no more than about 40, percent by weight and the aluminum phosphate content about from 37 to 76, and in many instances at least about 60, percent by weight. The mixture formed when this product is combined with the aggregate and water is a mortar which is workable for at least ten minutes, and hardens preferably within about an hour.

In an alternative embodiment, some or all of the aggregate is a part of the cement product, and the reaction is adapted to occur when the product, in the form of a storable dry mixture of components (a) and (b) and aggregate, is combined with the water and, optionally, with additional aggregate to form the above-described hardenable mixture. In the dry-mix product which contains all of the aggregate, the magnesium oxide content is about from 3 to 27, and in many instances no more than about 9, percent, the aluminum phosphate content about from 11 to 16 percent, and the aggregate content about from 58 to 86, and in many instances at least about 70, percent, all by weight. In a dry-mix product which contains a portion of the aggregate, e.g., the sand portion of a sand-gravel aggregate, the magnesium oxide content is about from 4 to 37, and in many instances no more than about 15, percent, the aluminum phosphate content about from 15 to 22 percent, and the aggregate content about from 54 to 81 percent, all by weight. The mixtures formed when these products are combined with the water also are mortars having a working time of at least ten minutes, and which harden preferably within about an hour.

As used herein, the term "cement product" includes not only the dry mixes described above, but also products containing liquid and solid constituents in a storable form. For example, in a still alternative embodiment, the cement product contains water, usually as a solvent for the aluminum phosphate, but, in this product, component (a) and the water are kept separated from one another until the time of use, when the above-described hardenable mixture is formed, thereby adapting components (a) and (b) to react together. For example, the magnesium oxide and an aqueous aluminum phosphate solution may be located in separate packages. In a product within this embodiment, the magnesium oxide content preferably is about from 3 to 10 percent, aluminum phosphate content about from 10 to 15 percent, the aggregate content about from 50 to 82 percent, and the water content about from 5 to 10 percent, all by weight.

Whether the cement product contains components (a) and (b) only, or one or both of the two other critical components (i.e., aggregate and water) as well, the magnesium oxide, aluminum phosphate, aggregate, and water content of the cement product per se, or of the mixture obtained after the product has been combined with water and/or aggregate, and the surface area, concentration, and particle size of the magnesium oxide, cooperate to control the reaction exotherm, more specifically in a manner such that the temperature experienced by a given weight of the mortar lies within a limited range, and the rise to peak temperature therein occurs gradually, as will be explained more fully hereinafter.

DETAILED DESCRIPTION

When the reactive components, i.e., magnesium oxide and aluminum phosphate, in the cement product of the present invention are combined with water to form a mortar, they react with the evolution of heat to form a hardened product, based on the reaction:

$$3MgO + Al(H_2PO_4)_3 \rightarrow Al(MgPO_4)_3.$$

The chemical composition and particle make-up of the cement product and mortar impose a unique and characteristic control on the magnitude and rate of development of the reaction exotherm, which in turn defines a product that is well-suited for working in large batches, e.g., for patching roadways. It has been found, for example, that mortars formed from cement products based on magnesium oxide and aluminum phosphate, which, in 45-kilogram samples, attain a peak temperature (exotherm) in the range of about from 40° to 90° C. after a period of at least ten minutes has elapsed from the time the mortar has been formed, are uniquely suited for patching roads under varying conditions of application and use. More specifically, by virtue of its characteristic exotherm, the mortar remains workable for a length of time, i.e., at least 10 minutes, which allows it to be comfortably mixed, placed in a hole, spread, and trowelled, while hardening quickly thereafter, e.g., within one hour, at which time vehicular traffic can be allowed to pass over the patch.

As will be shown hereinafter, the present cement products form mortars which are readily applied at widely different ambient temperatures and harden to products which have outstanding compressive strength and durability.

The above-specified exotherm characteristic of the present mortar is developed in a relatively large mass such as would be required for use in repairing pot holes. In such a product the exotherm is essentially a characteristic of the product itself. This is in contrast to the rock bolt grouting system described in the aforementioned U.S. Pat. No. 4,174,227 wherein a relatively thin annulus of the grout surrounds a heavy metal bolt, which acts as an internal heat sink and has an over-riding influence on the peak temperature attained by the grout.

The exotherm developed by the present cement product is defined as the peak temperature attained by 45 kilograms of the mixture of magnesium oxide, aluminum phosphate, aggregate, and water derived therefrom. For the present product, this temperature is in the range of about from 40° to 90° C., and preferably about from 50° to 70° C., and the rate of temperature rise is gradual enough that the peak temperature is not reached until at least 10 minutes have elapsed after the components have been combined. Preferably, the peak temperature is reached within one hour, most preferably within 30–50 minutes. It will be understood that a given mixture will develop a different temperature/time characteristic depending on its weight, as will be shown hereinafter with reference to Example 5. The fact that a small sample (e.g., 0.1 kilogram) of a mortar made from the cement product of the invention does not exhibit the above-defined temperature/time characteristic in no way detracts from the utility of the product for use in such areas as road patching because in such uses it is the behavior of the larger samples that is significant.

It will also be understood that a given mortar will develop a different temperature/time characteristic depending on ambient temperature. At higher ambient temperatures, the peak temperatures are higher and they are reached more quickly. Thus, a given composition may constitute a product of the invention by virtue of the fact that the mortar derived therefrom is adapted to attain a peak temperature in the above-specified range after the above-specified delay time over one specific range of ambient temperatures, while a different composition may constitute such a product by virtue of its mortar's ability to attain such a temperature/time characteristic over a different range of ambient temperatures. Any composition containing two, three, or all four of the critical components defined above that results in a reaction product having the above-stated temperature/time characteristic when combined at some useful ambient temperature constitutes a cement product of this invention.

The exotherm developed by the mortar made from the cement product of the invention allows the mortar to be workable for the length of time needed to install it in a hole in a roadbed. The working time, i.e., the time span from the incorporation of water into the solids to the time at which the mortar can no longer be trowelled, is at least 10 minutes, at least about 2 minutes of which time are consumed for mixing. The mortar becomes hard rapidly thereafter, generally within an hour (from the time the water and solids are brought together), and it reaches its peak temperature during this hardening period.

In the cement product and mortar of this invention one of the reactive components is magnesium oxide in the form of particles having a low surface area and small size. The surface area of the particles is less than about 1 m$^2$/g, and consequently the dead-burned or fused grade, as well as calcined grades, of MgO can be used. The bulk density of the particles in these grades is less than 3 g/cm$^3$. While up to as much as 90 percent of the particles may pass through a 200-mesh screen, often only up to about 50 percent do so. Moreover, the number of the finest screen on which the coarsest 10 percent of the particles are held is 170, and frequently 35 (i.e., 10 percent are held on a 170- or 35-mesh or coarser screen). Generally, the median particle size ranges from 10 to 250 micrometers. This particle size pattern has a direct influence on the temperature/time characteristic obtained with the reaction product. The percentage of the particles which pass through a 200-mesh screen will be lower, and the screen on which the coarsest 10 percent of the particles are held will be coarser, in products designed to be used in warm weather than in those intended for cold-weather use. It has been found, for example, that mortars formed by adding water to a dry mix formulation in a hot environment, i.e., when the ambient temperature is above about 20° C., especially above about 30° C., require increased amounts of larger, and reduced amounts of smaller, magnesium oxide particles. In such products, generally up to about 20 percent of the magnesium oxide particles will pass through a 200-mesh screen, and 10 percent will be held on a No. 18 or coarser screen. Mortars made by blending a dry mix and water at more moderate temperatures, e.g., about 10°-20° C., may contain up to about 40 percent of magnesium oxide particles which pass through a 200-mesh screen, with 10 percent held on a No. 20 or coarser screen. For use at temperatures below about 10° C., up to about 60 percent of the particles in such mortars generally will pass through a 200-mesh screen, with 10 percent held on a No. 35 or coarser screen.

Cement products containing aluminum phosphate in aqueous solution produce mortars which have a longer working time than mortars of the same composition produced from aluminum phosphate in a dry mixture with magnesium oxide. Therefore, while the particle size of the magnesium oxide in products containing aqueous aluminum phosphate likewise will vary depending on ambient temperature, these products may contain a higher percentage of finer magnesium oxide particles if acceleration of the reaction is desired. For example, they may contain up to about 90 percent of particles which pass through a 200-mesh screen, with 10 percent held on a No. 170 or coarser screen.

The achievement of the above-defined exotherm characteristic requires control of the magnesium oxide content of the mortar as well as the particle size. Increased amounts of larger particles require higher magnesium oxide concentrations to compensate for the possibly incomplete reaction of larger particles. Therefore, in products intended to be formulated from a dry mix and water at temperatures above about 20° C., in which products generally no more than about from 10 to 20 percent of the magnesium oxide particles will pass through a 200-mesh screen and 10 percent will be held on an 18-mesh or coarser screen, the magnesium oxide content should be in the range of about from 10 to 25, and preferably about from 12 to 18, percent.

In mortars to be made from dry aluminum phosphate at temperatures no higher than about 20° C., and in all mortars made by combining magnesium oxide with an aqueous aluminum phosphate solution, the magnesium oxide concentration preferably is in the range of about from 3 to 10 percent. Products containing less than about 3% magnesium oxide generally do not develop sufficient strength to be useful in weight-bearing applications such as road patching. When these products contain more than about 10% magnesium oxide, the peak temperature of the mixture tends to be too high and too rapidly attained, resulting in insufficient working time even at ambient temperatures as low as 0° C. With these products, highest strength is achieved with mixtures containing magnesium oxide in an amount equal to, or approximating, that required by stoichiometry. Inasmuch as at least about 10% aluminum phosphate is required in the finished product to achieve adequate strength, at least about 11% being preferred, about from 4% to 7% magnesium oxide is preferred on the basis of stoichiometry and a sufficiently low exotherm (4.1% MgO is required for 10.8% aluminum phosphate). There is no advantage in using an amount greatly in excess of the stoichiometric amount of aluminum phosphate, and, for this reason, usually no more than about 15%, and preferably no more than about 13%, of the finished product will be aluminum phosphate.

The aluminum phosphate can be present in the cement product as a particulate solid or in aqueous solution. If present as a solid in mixture with particulate magnesium oxide, the solids should be dry to prevent the product from setting up during storage. Care should be taken to dry the solids well, and to perform grinding operations in a dry atmosphere. Although, as mentioned previously, small amounts of insoluble aluminum phosphates may be included in the aluminum phosphate component, it is preferable to avoid more than a few percent, e.g., more than about five percent, of such insolubles. Also, phosphorus pentoxide interferes with the present product's ability to achieve the specified controlled exotherm, and any significant amounts thereof should be excluded.

Particulate aluminum phosphate preferably has a median particle size of 10–25 micrometers, and a maximum particle size of 250 micrometers, to assure that all of it is able to dissolve in the water before the reaction of a portion thereof with magnesium oxide causes the mixture to harden.

The water content of the mortar, or of the precursor cement product, is about from 5 to 10, and preferably about from 7 to 9, percent by weight based on the total weight of the four critical components. With lesser amounts of water, the mortar is too dry to produce a strong reaction product; and larger amounts deleteriously affect the compressive strength of the product.

The other critical component of the cement product and mortar is the aggregate, which cooperates with the other components to produce the controlled exotherm, and which also increases the strength of the reaction product. Strength is adversely affected by the evolution of gas during the setting reaction, however, and for this reason the aggregate should be a material which does not react with the aluminum phosphate under evolution of gas. Accordingly, carbonate aggregates should be avoided. Aggregates which can be used include silica, sand, quartz, river-bed gravel, crushed granite, basalt, etc. The sizes of the aggregate particles are mixed to provide denser packing, which increases the compressive strength of the reaction product. A mixture of fine and coarse aggregate, e.g., sand and gravel, respectively, can be used, for example. A typical sand for use in the present product is the one defined in ASTM C33, and a typical gravel is river-bed gravel 1.6 to 25 mm in diameter.

The aggregate content of the mortar, or of the cement product, is about from 50 to 82, and preferably about from 60 to 75, percent by weight, based on the total weight of the four critical components. The proper aggregate material, in these specified amounts, contributes to the attainment of the required exotherm control by serving as a most effective heat sink to dissipate some of the heat of reaction by virtue of its intimate contact with the reactants. At the same time, this amount of aggregate contributes to the attainment of a satisfactory compressive strength in the reaction product.

In the following examples, the solid ingredients were charged to a mixer, water was added, and the solids and liquid were blended for three minutes. The resulting mortar was then ready to be dumped where needed, spread, levelled, and trowelled. Parts are by weight.

EXAMPLE 1

The following ingredients were blended together:

| | Parts (per 100 parts of mixture) |
|---|---|
| (a) MgO | 4.5 |
| (b) Al(H$_2$PO$_4$)$_3$ | 12.0 |
| (c) sand | 53.5 |
| (d) gravel | 22.0 |
| (e) water | 8.0 |

Components (a), (b), (c), and (d) could be supplied as a single dry product consisting of 6.5% MgO, 13.0% Al(H$_2$PO$_4$)$_3$, 56.5% sand, and 24% gravel, and the water would be added thereto by the user. Alternatively, components (a), (b), and (c) could be supplied as a single dry product consisting of 9% MgO, 17% Al(H$_2$PO$_4$)$_3$, and 74% sand, and the gravel and water would be added thereto. Still alternatively, components (a) and (b) could be supplied as a single dry product consisting of 33% MgO and 67% Al(H$_2$PO$_4$)$_3$, and the sand, gravel, and water added thereto.

The magnesium oxide was a product which had been obtained by calcining naturally occurring magnesite (MgCO$_3$) at a temperature of at least about 900° C. The calcined product had been ground to a powder having a mean diameter of 112 μm and a maximum diameter of 1413 μm, with 35% of the particles passing through a 200-mesh screen, and 10% being held on a 20-mesh screen. The surface area was approximately 0.4 square meter per gram, and the bulk density 2.2 g/cm$^3$.

The aluminum phosphate was made by adding phosphoric acid to aluminum oxide, Al$_2$O$_3$.3H$_2$O (3/1 acid/base molar ratio), evaporating the water from the resulting 70% aqueous solution of aluminum phosphate at 130° C., and grinding the solid phosphate in a dry environment to an average particle diameter of 33 microns.

The aggregate used was a combination of fine and coarse aggregates, i.e., sand and gravel, respectively. The sand, of mixed particle sizes as specified in ASTM C33, had the following size distribution: 95–100% smaller than 4.75 mm, 80–100% smaller than 2.36 mm, 50–85% smaller than 1.18 mm, 20–60% smaller than 600 μm, 10–30% smaller than 300 μm, and 2–10% smaller than 150 μm. The gravel was river bed gravel 3.2 mm thick × 1.6 mm in diameter.

At 20° C., a 45-kg sample of this mortar had a working time of 10 minutes, and was hard in 60 minutes. It reached a peak temperature of 69° C. in 30 minutes. The average compressive strength of the hardened product was 18,200 kilopascals.

At −1° C., a 45-kg sample of the same mortar had a working time of 28 minutes, and took 3 hours to harden. Its maximum temperature, 40° C., was reached in 180 minutes. The average compressive strength of the hardened product was 21,700 kilopascals. Thus, this cement is better adapted to be used in warm weather.

EXAMPLE 2

The procedure described in Example 1 was repeated with the exception that 2.0 parts of a finer-size magnesium oxide was added per 100 parts of the mixture of components (a), (b), (c), (d), and (e). The finer magnesium oxide was a product which had been made by dehydrating at 350° C. magnesium hydroxide obtained from sea water, and calcining at a temperature of at least 900° C. The calcined product had been ground to a powder having a mean particle diameter of 13.2 μm, and a maximum diameter of 125 μm, with 10% of the particles smaller than 3.9 μm. Its surface area was less than 1 square meter per gram, and it contained less than 5% impurities. Of the total magnesium oxide (coarse+fine), 48 percent of the particles passed through a 200-mesh screen, and 10 percent were held on 35-mesh screen.

The ingredients were blended at an ambient temperature of −8° C. At this temperature a 45-kg sample of the mortar had a working time of 11 minutes, reached a maximum temperature of 68° C. in 30 minutes, and was hard in 40 minutes. The compressive strength of the set product was 20,950 kilopascals. This same mortar, at 19° C., had a working time of only 4 minutes and was hard in 12 minutes. Its maximum temperature, 84° C., was reached in 15 minutes. Its compressive strength was 23870 kilopascals. Thus, this cement is adapted to be used in cold weather.

Another batch of the freshly mixed mortar was installed in a 1.2×0.3 meter, 7.6 cm deep, hole in an asphalt road bed at an ambient temperature of −6° C. This was accomplished by adding the water to the solid components in a concrete mixer, tumbling the resulting mortar in the mixer for three minutes, and then dumping the mortar into the hole. The mortar spread easily, was workable for 10 minutes, and was hard in 50 minutes. A maximum temperature of 80° C. was reached 36 minutes after mixing had been started. Eighty minutes after the mixing had been started, a tractor trailer drove over the patched hole with no ill-effects on the patch. Its average compressive strength was 27420 kilopascals.

The above cold-weather formulation could be supplied by including a separate package of the finer-grade MgO with a package of the warm-weather formulation of Example 1. Should the temperature drop to about 5° C. or lower, the latter formulation could be converted to a cold-weather formulation by blending the finer-grade MgO together with the components of the warm-weather formulation.

EXAMPLE 3

The procedure described in Example 1 was repeated except that 16 parts of MgO and 42 parts of sand were used, and the MgO had a surface area of approximately 0.12 m$^2$/g and a mean particle size of 300 μm. Fifteen percent of the MgO particles passed through a 200-mesh screen, and 10 percent were held on an 18-mesh screen.

At an ambient temperature of 21° C., the mortar remained workable for 18 minutes, reaching a maximum temperature of 70° C. in 30 minutes. The average compressive strength of the hardened product was 25,370 kilopascals. Because of its extra working time (in contrast to the Example 1 product), this product is adapted to be used at temperatures of about 30° C., for example, where its working time would be expected to be reduced to about 10 minutes.

EXAMPLE 4

The following ingredients were blended together:

|  | Parts (per 100 parts of mixture) |
|---|---|
| (a) MgO | 5 |
| (b) sand | 55 |
| (c) gravel | 22 |
| (d) 60% aqueous solution of Al(H$_2$PO$_4$)$_3$ | 18 (ie., 11 parts Al(H$_2$PO$_4$)$_3$ and 7 parts H$_2$O) |

This product could be provided as a two-component system wherein the magnesium oxide component, e.g., in a combination of ingredients (a), (b), and (c), can be kept separate from the water-containing component, i.e., ingredient (d), until the time of use.

In this instance, the MgO was a fused −325 mesh product. After grinding, it had a bulk density of 1.39 g/cm$^3$, a surface area of 0.6 m$^2$/g, a mean particle diameter of 19.4 μm, and a maximum particle diameter of 99 μm. About 85 percent of the particles passed through a 200-mesh screen, and 10 percent were held on a 170-mesh screen. The gravel was 3.2 mm thick × 6.4 mm in diameter. The sand was the same as that described in Example 1.

The solid ingredients were blended in a cement mixer, and then the aluminum phosphate solution was added. The materials were mixed for three minutes at an ambient temperature of 15°-20° C., after which the mix was dumped into a 1.2 × 0.3 meter, 7.6 cm deep, pothole in an asphalt roadbed. The mortar remained workable for 9 minutes. The maximum temperature of 55° C. was reached after 40 minutes. The compressive strength of the set product was 26,000 kilopascals. The patch showed no signs of deterioration after one year in service with heavy truck traffic.

CONTROL EXPERIMENTS (a) The procedure described in Example 4 was repeated except that the magnesium oxide content was increased to 13.0 parts, and the magnesium oxide particle surface area was 0.6 m$^2$/g, with 90% of the particles passing through a 200-mesh screen, and 10% held on a 170-mesh screen. The mixture hardened within seconds in the mixer.

(b) The procedure described in Example 1 was repeated except that the aluminum phosphate was replaced by 13 parts of monoammonium phosphate. The resulting mortar had a working time of 20 minutes, but it achieved a compressive strength of only 627 kilopascals after 24 hours. The addition of polyphosphates to this system improved the strength, but reduced the working time to less than 6 minutes.

EXAMPLE 5

The procedure described in Example 1 was repeated except that the amount and type of magnesium oxide used were the same as described in Example 4. Although a 100-gram sample of the mortar reached a peak temperature of 92° C. in less than 4 minutes, a 45-kilogram sample of the mortar reached a peak temperature of 84° C. in 16 minutes, had a working time of 9 minutes, and was hard in 45 minutes.

I claim:

1. A storable cement product containing (a) magnesium oxide in the form of particles which have a surface area of less than about 1 square meter per gram, and up to 90 percent of which pass through a 200-mesh screen and 10 percent of which are held on a 170-mesh or coarser screen; and (b) aluminum phosphate; components (a) and (b) being adapted to be combined with water and an inert aggregate of mixed particle sizes in amounts such as to form a mixture therewith comprising, by weight, about from 3 to 25 percent of component (a), about from 10 to 15 percent of component (b), about from 5 to 10 percent water, and about from 50 to 82 percent aggregate, and thereupon to undergo a reaction which raises the temperature of a 45-kilogram sample of the mixture to a peak temperature in the range of about from 40° to 90° C. at a rate such that said peak temperature is reached after the elapse of at least 10 minutes after the formation of said mixture.

2. A cement product of claim 1 wherein up to about 50 percent of said magnesium oxide particles pass through a 200-mesh screen and 10 percent are held on a 35-mesh or coarser screen, and said mixture comprises, by weight, up to about 10 percent magnesium oxide and at least 60 percent aggregate.

3. A cement product of claim 1 in the form of a dry mix of magnesium oxide and aluminum phosphate, said reaction between components (a) and (b) being adapted to occur when said product is combined with said aggregate and water.

4. A cement product of claim 3 consisting essentially of about from 24 to 63 percent by weight of said magnesium oxide and about from 37 to 76 percent by weight of said aluminum phosphate.

5. A mortar comprising the cement product of claim 3 freshly combined with water and an inert aggregate of mixed particle sizes in amounts such as to form said mixture therewith, a 45-kilogram sample of said mortar being workable for at least 10 minutes.

6. A cement product of claim 1 in the form of a dry mix of magnesium oxide, aluminum phosphate, and inert aggregate, said reaction between components (a) and (b) being adapted to occur when said product is combined with said water.

7. A cement product of claim 6 consisting essentially of about from 3 to 27 percent magnesium oxide, about from 11 to 16 percent aluminum phosphate, and about from 58 to 86 percent aggregate, all by weight.

8. A cement product of claim 6 consisting essentially of about from 4 to 37 percent magnesium oxide, about from 15 to 22 percent aluminum phosphate, and about from 54 to 81 percent sand, all by weight, said reaction between components (a) and (b) being adapted to occur when said product is combined with gravel.

9. A mortar comprising the cement product of claim 6 freshly combined with water in an amount such as to form said mixture therewith, a 45-kilogram sample of said mortar being workable for at least 10 minutes.

10. A cement product of claim 3 or claim 6 wherein up to about 20 percent of said magnesium oxide particles pass through a 200-mesh screen and 10 percent are held on an 18-mesh or coarser screen, and the magnesium oxide content, by weight, of said water- and aggregate-containing mixture is about from 10 to 25 percent, components (a) and (b) being adapted to react at ambient temperatures above about 20° C.

11. A cement product of claim 3 or claim 6 wherein up to about 40 percent of said magnesium oxide particles pass through a 200-mesh screen and 10 percent are held on a 20-mesh or coarser screen, and the magnesium oxide content, by weight, of said water- and aggregate-containing mixture is about from 3 to 10 percent, components (a) and (b) being adapted to react at ambient temperatures of about from 10° C. to 20° C.

12. A cement product of claim 3 or claim 6 wherein up to about 60 percent of said magnesium oxide particles pass through a 200-mesh screen and 10 percent are held on a 35-mesh screen, and the magnesium oxide content, by weight, of said water- and aggregate-containing mixture is about from 3 to 10 percent, components (a) and (b) being adapted to react at ambient temperatures below about 10° C.

13. A cement product of claim 1 containing said water as a component which is separated from said magnesium oxide, said reaction between components (a) and (b) being adapted to occur when they are combined with said water.

14. A cement product of claim 13 wherein said aluminum phosphate is present in aqueous solution.

15. A cement product of claim 14 consisting essentially of, by weight, about from 3 to 10 percent magnesium oxide, about from 10 to 15 percent aluminum phosphate, about from 50 to 82 percent aggregate, and about from 5 to 10 percent water.

16. A cement product of claim 14 wherein said magnesium oxide and said aluminum phosphate solution are separately packaged.

17. A mortar comprising the cement product of claim 13 freshly mixed so as to combine said water with the remainder thereof to form said mixture, a 45-kilogram sample of said mortar being workable for at least 10 minutes.

18. A cement product of claim 14 wherein up to about 90 percent of said magnesium oxide particles pass through a 200-mesh screen and 10 percent are held on a 170-mesh or coarser screen, and the magnesium oxide content, by weight, of said water- and aggregate-containing mixture is about from 3 to 10 percent.

* * * * *